United States Patent [19]

Magerstedt et al.

[11] Patent Number: 5,726,227
[45] Date of Patent: Mar. 10, 1998

[54] POLYMER MOULDING COMPOSITIONS STABILISED WITH PHOSPHOROUS ACID ESTERS

[75] Inventors: Herbert Magerstedt, Moers; Ernst Grigat, Leverkusen, both of Germany

[73] Assignee: Bayer AG, Leverkusen, Germany

[21] Appl. No.: 754,233

[22] Filed: Nov. 20, 1996

[30] Foreign Application Priority Data

Nov. 30, 1995 [DE] Germany ............ 195 44 675.5

[51] Int. Cl.⁶ .................................................. C08K 5/15
[52] U.S. Cl. .......................................... 524/107; 524/109
[58] Field of Search .................................... 524/107, 109

[56] References Cited

U.S. PATENT DOCUMENTS

| 3,209,013 | 9/1965 | Hechenbleikner et al. | 524/107 |
| 3,305,520 | 2/1967 | Fritz et al. | 260/45.7 |
| 3,794,629 | 2/1974 | Eimers et al. | 524/107 |
| 4,073,769 | 2/1978 | Eimers et al. | 524/107 |
| 4,323,501 | 4/1982 | Eimers et al. | 260/333 |

FOREIGN PATENT DOCUMENTS

| 477615 | 3/1992 | European Pat. Off. | 524/107 |
| 1 128 653 | 4/1962 | Germany . | |
| 2 064 599 | 7/1971 | Germany . | |
| 2 140 207 | 2/1973 | Germany . | |
| 2 255 639 | 5/1974 | Germany . | |
| 26 15 341 | 10/1977 | Germany . | |

OTHER PUBLICATIONS

Orbit Abstract of DE 2 064 599 (Jul. 22, 1971).
Orbit Abstract of DE 2 140 207 (Feb. 15, 1973).
Orbit Abstract of DE 2 255 639 (May 16, 1974).
Orbit Abstract of DE 26 15 341 (Oct. 27, 1977).

*Primary Examiner*—Kriellion S. Morgan
*Attorney, Agent, or Firm*—Connolly & Hutz

[57] ABSTRACT

Thermoplastic moulding compositions containing

A) polymers selected from the group comprising polyolefines, styrene polymers, polyamides, polyalkyl methacrylates, polyphenylene sulphides, ABS graft polymers, and thermoplastic polyurethanes, and B) esters of phosphorous acid which contain at least one oxetane group and at least one radical of a dihydric or polyhydric phenol per molecule, and
optionally C) fillers and reinforcing materials, D) flame retardant additives, E) elastomeric modifiers.

19 Claims, No Drawings

POLYMER MOULDING COMPOSITIONS STABILISED WITH PHOSPHOROUS ACID ESTERS

This invention relates to moulding compositions comprising polyolefines, styrene polymers, polyamides, polyalkyl methacrylates, polyphenylene sulphides, ABS graft polymers and/or thermoplastic polyurethanes, which contain phosphorous acid esters.

Phosphorous acid esters are added to polycarbonate and polyester, particularly to polyalkylene terephthalate moulding compositions, for stabilisation during thermal loading, particularly for preventing discoloration phenomena during the production of these products, during compounding and subsequent granulation of the products and during the processing of the products to form thermoplastic moulded bodies (e.g. DE-OS 2 140 207, DE-OS 2 255 639 and DE-OS 2 615 341).

Furthermore, it is known that discoloration during production and processing can be reduced by the addition of tertiary phosphorous acid esters to polycarbonate (DE-AS 1 128 653 and U.S. Pat. No. 3 305 520).

It is also known that phosphorous acid esters can be used in combination with Ba, Sr or Ca carbonate for the stabilisation of mixtures containing brominated polycarbonate (DE-OS 2 064 599).

It has now been found that a significant reduction in discoloration behaviour is observed, particularly in ageing tests, with moulding compositions comprising polyolefines, styrene polymers, polyamides, polyalkyl methacrylates, polyphenylene sulphides, ABS graft polymers and/or thermoplastic polyurethanes, and which contain phosphorous acid esters. The moulding compositions according to the invention possess a good resistance to hydrolysis and good thermal stability.

The present invention relates to thermoplastic moulding compositions containing

A) polymers selected from the group comprising polyolefines, styrene polymers, polyamides, polyalkyl methacrylates, polyphenylene sulphides, ABS graft polymers, and thermoplastic polyurethanes, and B) esters of phosphorous acid which contain at least one oxetane group and at least one radical of a dihydric or polyhydric phenol per molecule, and optionally C) fillers and reinforcing materials, D) flame retardant additives, E) elastomeric modifiers.

The content of polymers as defined by component A) is generally 20 to 99.99, preferably 40 to 99.97, particularly 60 to 99.95 parts by weight.

The content of phosphorous acid esters as defined by component B) in the moulding composition is generally 0.01 to 2.5, preferably 0.03 to 1.0, particularly 0.05 to 0.4 parts by weight (with respect to the total mixture).

If fillers and reinforcing materials are added to the mixture, preferably up to 45, most preferably 10 to 40 parts by weight of fillers and reinforcing materials are used.

Mineral flame retardant additives are preferably added in amounts of 30 to 55 parts by weight.

The moulding compositions according to the invention may contain up to 20, preferably 3 to 18, particularly 6 to 15 parts by weight of halogenated compounds, and up to 8, preferably 2 to 6, parts by weight of antimony compounds, particularly antimony trioxide or antimony pentoxide.

Elastomeric modifiers as defined by component E) are preferably added in amounts of up to 30 parts by weight, most preferably 5 to 25 parts by weight. The quantitative data are quoted with respect to the total mixture in each case.

Component A

Polyolefines according to the invention are polymers of aliphatic unsaturated hydrocarbons, such as ethylene, propylene, butylene or isobutylene for example, which are obtained by customary methods, e.g. radical-initiated polymerisation, and which have weight average molecular weights $M_W$ (measured by gel chromatography methods) between 5000 and 3,000,000. Both high pressure polyolefine and low pressure polyolefine can be used. The unsaturated hydrocarbons may also be copolymerised in the known manner with other vinyl monomers, such as vinyl acetate, acrylic acid or acrylic acid esters, for example, wherein the maximum content of vinyl monomers is 30% by weight, preferably up to 25% by weight.

Polyethylene and polypropylene are preferred.

Styrene polymers in the sense of the invention are homopolymers of styrene (polystyrene) or copolymers, preferably with acrylonitrile and/or maleic acid esters, which are produced from the monomers or from the mixture of monomers by suspension polymerisation in the presence of catalysts, for example. The styrene polymers generally have weight average molecular weights of 10,000 to 600,000 (measured in DMF at a concentration of 5 g/liter and at 20° C.).

$C_1$–$C_4$ alkyl methacrylate copolymers which are suitable according to the invention include known polymers of methyl, ethyl, propyl and butyl methacrylates, preferably methyl and ethyl methacrylates. It should be understood that these methacrylic acid esters include both homopolymers and copolymers. In addition, amounts up to a maximum of 9.5% by weight, with respect in each case to the total weight of these unsaturated monomers and methacrylic acid esters, of other ethylenically unsaturated, copolymerisable monomers can be copolymerised, so that the $C_1$–$C_4$-alkyl methacrylate copolymers which are suitable according to the invention are synthesised from 90.5% by weight to 100% by weight of alkyl methacrylate units and from 9.5% by weight to 0% by weight of other ethylenically unsaturated monomer units.

Examples of other ethylenically unsaturated monomers include (meth)acrylonitrile, (α-methyl)styrene, bromostyrene, vinyl acetate, acrylic acid $C_1$–$C_8$-alkyl esters, (meth)acrylic acid aryl esters, (meth)acrylic acid, ethylene, propylene, N-vinylpyrrolidone, vinyl sulphonic acid (salts) or styrenesulphonic acid (salts).

The $C_1$–$C_4$-alkyl methacrylate copolymers constitute substances which are soluble in defined organic solvents and which have a linear or branched structure. Polymers containing gels, i.e. those with crosslinked structures, are not polymers (b) in the sense of the invention.

The polyalkyl methacrylates can be produced by known polymerisation processes, but are preferably produced by radical-initiated or thermal polymerisation. Processes in emulsion, bulk, suspension or dispersion, particularly emulsion polymerisation, and preferably bulk or solution polymerisation, are suitable as polymerisation processes. The molecular weights may be varied within broad ranges by known measures determined by the process used, for example by the use of mercaptans as regulators. The polyalkyl methacrylates which can be used according to the invention usually have molecular weights (or limiting viscosity numbers or melt viscosities) which make it sensible to process them by thermoplastic injection moulding or extrusion.

Polyphenylene sulphides in the sense of the invention are described in EP-A 171 021, for example.

Thermoplastic polyurethanes in the sense of the invention are reaction products of diisocyanates with completely or predominantly aliphatic oligo- and/or polyesters and/or ethers and with one or more chain extenders. These thermoplastic polyurethanes are substantially linear and possess thermoplastic processing characteristics.

These thermoplastic polyurethanes are either known or can be produced by known methods (see U.S. Pat. No. 3,214,411, J. H. Saunders and K. C. Frisch, "Polyurethanes, Chemistry and Technology", Vol. II, pages 299 to 451, Interscience Publishers, New York, 1964, and Mobay Chemical Corporation, "A Processing Handbook for Texin Urethane Elastoplastic Materials", Pittsburgh, Pa., for example).

Examples of starting materials for the preparation of the oligoesters and polyesters include adipic acid, succinic acid, suberic acid, sebacic acid, oxalic acid, methyladipic acid, glutaric acid, pimelic acid, azelaic acid, phthalic acid, terephthalic acid and isophthalic acid.

Adipic acid is preferred in this respect.

Examples of glycols for preparing the oligoesters include ethylene glycol, 1,2- and 1,3-propylene glycol, 1,2-, 1,3-, 1,4-, 2,3-, and 2,4-butanediol, hexanediol, bis-hydroxymethyl cyclohexane, diethylene glycol and 2,2-dimethylpropylene glycol. In addition, small amounts of up to 1 mole % of trifunctional alcohols, or alcohols with a functionality greater than three, e.g. trimethylolpropane, glycerol, hexanetriol, etc., can be used in conjunction with the glycols.

The resulting hydroxyl-oligo- or polyesters have a molecular weight of at least 600, a hydroxyl number of about 25 to 190, preferably about 40 to 150, an acid number of about 0.5 to 2, and a water content of about 0.01 to 0.2%.

The oligo-esters or polyesters also include oligomeric or polymeric lactones, such as oligo-caprolactone or poly-caprolactone for example, and aliphatic polycarbonates, such as poly-1,4-butanediol carbonate or poly-1,6-hexanediol carbonate, for example.

A particularly suitable oligo radical, which can be used as a starting material for the thermoplastic polyurethanes, is prepared from adipic acid and a glycol which contains at least one primary hydroxyl group. Condensation is terminated when an acid number of 10, preferably about 0.5 to 2, is reached. The water formed during the reaction is separated simultaneously or subsequently, so that the final water content is within the range of about 0.01 to 0.05%, preferably 0.01 to 0.02%.

Examples of oligo- or polyethers for producing the thermoplastic polyurethanes include those based on tetramethylene glycol, propylene glycol and ethylene glycol.

Polyacetates are also to be understood as polyethers, and are usable.

The oligoethers or polyethers should have average molecular weights Mn (number average, determined via the OH number of the products) of 600 to 2000, preferably of 1000 to 2000.

4,4'-diphenylmethane diisocyanate is preferably used as the organic diisocyanate for producing the polyurethanes as defined by component A. It should contain less than 5% of 2,4'-diphenylmethane diisocyanate and less than 2% of the dimers of diphenylmethane diisocyanate. It is also desirable that its acidity, calculated as HCl, falls within the range of about 0.005 to 0.2%. The acidity, calculated as HCl, is determined by extracting the chloride from the isocyanate in hot, aqueous methanol solution or by releasing the chloride by hydrolysis with water and titrating the extract with standard silver nitrate solution, in order to ascertain the chloride ion concentration present therein.

Other diisocyanates may also be used for producing the thermoplastic polyurethanes, for example the diisocyanates of ethylene, ethylidene, propylene, butylene, 1,3-cyclopentylene, 1,4-cyclohexylene, 1,2-cyclohexylene, 2,4-tolylene, 2,6-tolylene, p-phenylene, n-phenylene, xylene, 1,4-naphthylene, 1,5-naphthylene, 4,4'-diphenylene, 2,2-diphenylpropane 4,4'-diisocyanate, azobenzene 4,4'-diisocyanate, diphenylsulphone 4,4'-diisocyanate, dichloro-hexanemethylene diisocyanate, pentamethylene diisocyanate, hexamethylene diisocyanate, 1-chlorobenzene-2,4-diisocyanate, furfuryl diisocyanate, dicyclohexylmethane diisocyanate, isophorone diisocyanate, diphenylethane diisocyanate and the bis (isocyanatophenyl) ethers of ethylene glycol, butanediol, etc.

Difunctional organic compounds which contain active hydrogen which is reactive with isocyanates can be used as chain extenders, e.g. diols, hydroxycarboxylic acids, dicarboxylic acids, aliamines, alkanolamines and water. Examples of these include ethylene glycol, propylene glycol, butylene glycol, 1,4-butanediol, butanediol, butinediol, xylylene glycol, amylene glycol, 1,4-phenylene-bis-β-hydroxyethyl ether, 1,3-phenylene-bis-β-hydroxylethyl ether, bis-(hydroxymethyl-cyclohexane), hexanediol, adipic acid, ω-hydroxycaproic acid, thiodiglycol, ethylenediamine-, propylene-, butylene-, hexamethylene-, cyclohexylene-, phenylene-, toluylene- and xylylene diamine, diaminodicyclohexylmethane, isophoronediamine, 3,3'-dichlorobenzidine, 3,3'-dinitrobenzidine, ethanolamine, aminopropyl alcohol, 2,2-dimethylpropanolamine, 3-aminocyclohexyl alcohol and p-aminobenzyl alcohol. The molar ratio of oligo- or polyester to difunctional chain extenders varies within the range of 1:1 to 1:50, preferably 1:2 to 1:30.

Apart from difunctional chain extenders, trifunctional chain extenders, or chain extenders having a functionality greater than three, can be used in secondary amounts up to about 5 mole % with respect to the moles of difunctional chain extenders used.

Examples of chain extenders of this type, which are trifunctional or which have a functionality greater than three, include glycerol, trimethylolpropane, hexanetriol, pentaerythritol and triethanolamine.

Monofunctional components, for example butanol, can also be use for producing the thermoplastic polyurethanes as defined by component A.

The diisocyanates, oligoesters, polyesters, polyethers, chain extenders and monofunctional components cited as synthesis components for the thermoplastic polyurethanes are either known from the literature or are obtainable by methods known from the literature.

The known production of the thermoplastic polyurethane component is described in DE-OS 4 309 981, for example.

ABS polymers in the sense of the invention are described in EP-A 345 522, for example.

Component B

Phosphorous acid esters in the sense of the invention are esters of phosphorous acid which contain at least one oxetane group and at least one radical of a dihydric or polyhydric phenol per molecule.

Phosphorous acid esters of formula (I) are preferred,

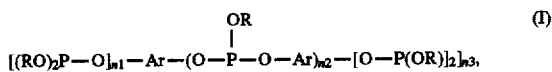  (I)

where
- $n_1$ represents 1 or any integer >1, preferably 1 to 9,
- $n_2$ represents 0 or any integer >0, preferably 0 to 2,
- $n_3$ represents 1 or any integer >1, preferably 1 to 9,
- R represents alkyl, aralkyl, cycloalkyl, aryl or heteroaryl, wherein at least one of the radicals R constitutes a monoalcohol containing at least one oxetane group, and
- Ar represents aryl, which may optionally be substituted by alkyl and/or hydroxy, and where when $n_2 \neq 0$ Ar may be the same or different, and compounds selected from
tris-[(3-ethyloxetanyl-3)-methyl]-phosphite,
tris-[(3-pentyloxetanyl-3)-methyl]-phosphite,
phenyl-bis-[(3-ethyloxetanyl-3)-methyl]-phosphite,
2-phenoxy-spiro(1,3,2-dioxaphosphorinane-5,3'-oxetane),
3,3-bis-[spiro(oxetane-3',5"-(1",3",2"-dioxaphosphorinane-2"))-oxymethyl]-oxetane.

Examples of radicals R which are suitable in formula (I) include: $C_1$–$C_{18}$-alkyl, mono- or polynuclear $C_3$–$C_{10}$-cycloalkyl, phenyl-$C_1$–$C_2$-alkyl, mono- or polynuclear $C_6$–$C_{18}$-aryl such as phenyl, naphthyl, anthracyl, phenanthryl, biphenyl, phenoxyphenyl or fluorenyl, and also heteroaryls, such as tetrahydrofuryl, for example, wherein the aryl radicals may be substituted by alkyl and/or halogen, such as $C_1$–$C_{18}$-alkyl, chlorine and/or bromine, for example.

The radical R may also be a derivative of a $C_1$–$C_6$ monoalcohol containing one or more oxetane groups P.

The heterocyclic radical

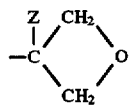

is to be understood as the oxetane group P, where Z may be H, $CH_3$, $C_2H_5$, n-$C_5H_{11}$, —$CH_2$—$C_5H_{11}$, —$CH_2$—O—$C_6H_{13}$ or $CH_2$—O—$C_2H_5$.

The radical R in formula (I) above may also itself represent the oxetane group P, with Z=H for example.

The radical Ar is derived from phenols containing 2 phenolic hydroxyl groups. The radical Ar is preferably derived from the following compounds: hydroquinone, resorcinol, catechol, di-t-butyl catechol, 4,4'-dihydroxydiphenyl, bis-(hydroxyphenyl)-alkanes, such as $C_1$–$C_8$-alkylene- or $C_2$–$C_8$-alkylidene bisphenols for example, bis-(hydroxyphenyl)-cycloalkanes, such as $C_5$–$C_{15}$-cycloalkylene- or $C_5$–$C_{15}$-cycloalkylene bisphenols for example, α,α'-bis-(hydroxyphenyl)-diisopropylbenzene, and the corresponding compounds with alkylated or halogenated nuclei, for example bis-(4-hydroxy-phenyl)-propane-2,2 (bisphenol A), bis-(4-hydroxy-3,5-dichlorophenyl)-propane-2,2 (tetrachlorobisphenyl A), bis-(4-hydroxy-3,5-dibromophenyl)-propane-2,2 (tetrabromobisphenol A), bis-(4-hydroxy-3,5-dimethylphenyl)-propane-2,2 (tetramethylbisphenol A), bis-(4-hydroxy-3-methylphenyl)-propane-2,2-cyclohexane-1,1 (bisphenol Z), and also α,α'-bis-(4-hydroxyphenyl)-p-diisopropyl-benzene, dihydroxynaphthalenes and dihydroxyanthracenes.

Phloroglucinol and pyrogallol are suitable as phenols containing more than two phenolic hydroxy groups, for example.

Amongst the claimed compounds, compounds of formula (I) are preferred which are derived from 2,2-bis-(hydroxyphenyl)-alkanes and from monoalcohols containing oxetane groups, i.e. compounds of formula (I) where Ar corresponds to a radical of formula (II)

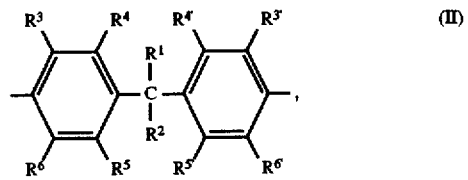  (II)

where
$R^1$ and $R^2$ are the same or different and represent H, $C_1$–$C_{18}$-alkyl, mono- or polynuclear $C_3$–$C_6$-cycloalkyl, or mono- or polynuclear $C_6$–$C_{18}$-aryl,
$R^3$, $R^{3'}$, $R^4$, $R^{4'}$, $R^5$, $R^{5'}$, $R^6$ and $R^{6'}$ are the same or different and represent H, $C_1$–$C_{18}$-alkyl, mono- or polynuclear $C_3$–$C_6$-cycloakly, mono- or polynuclear $C_6$–$C_{18}$-aryl, $C_1$–$C_{18}$-alkoxy, or halogen.

The alkyl substituents which are suitable as a substituent for compounds of formula (II) may be unbranched or branched, saturated or unsaturated. Suitable aryl substituents may comprise phenyl or biphenyl, for example. The preferred halogen substituents are Cl or Br.

The compounds of formula (I) in which Ar corresponds to a radical of formula (II) are by the reaction of the corresponding bisphenols of formula (III)

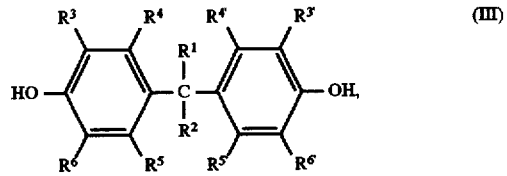  (III)

where
$R^1$ to $R^6$ and $R^{3'}$ to $R^{6'}$ have the aforementioned meaning and are obtained in the manner described in DE-OS 2 255 639.

The compounds of the claimed type constitute high-boiling liquids, resins or solids. They are readily soluble in organic solvents, particularly in the solvents used in the production of polycarbonates, and are therefore particularly suitable for use as stabilisers in polycarbonates of high viscosity which are produced or processed at high temperatures.

These compounds, of which some examples are listed below, may be produced and used individually or in a mixture. The phosphites may have a linear or branched structure.

The following survey exemplifies a selection of them:

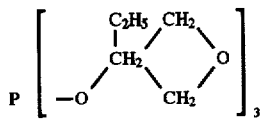

-continued
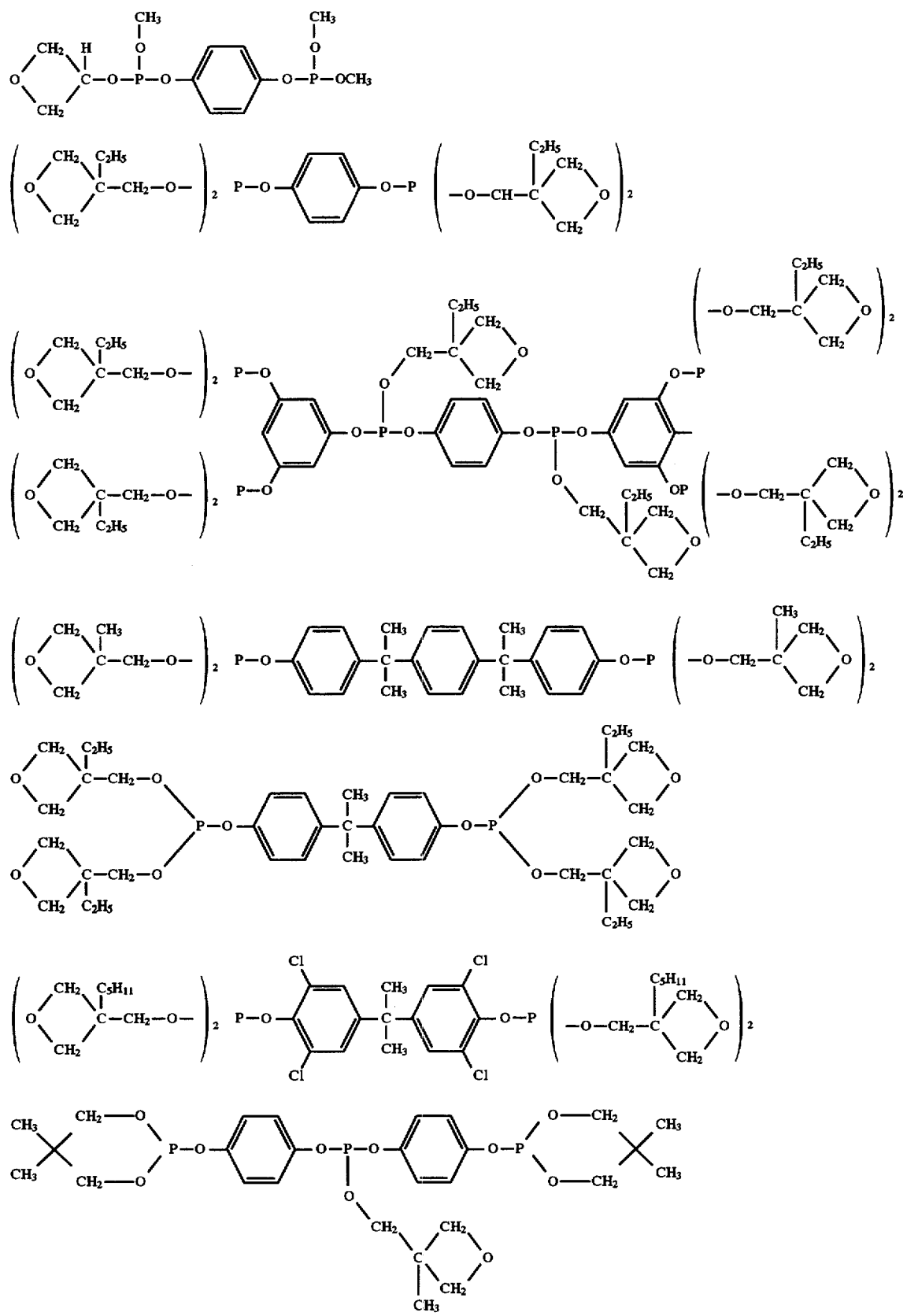

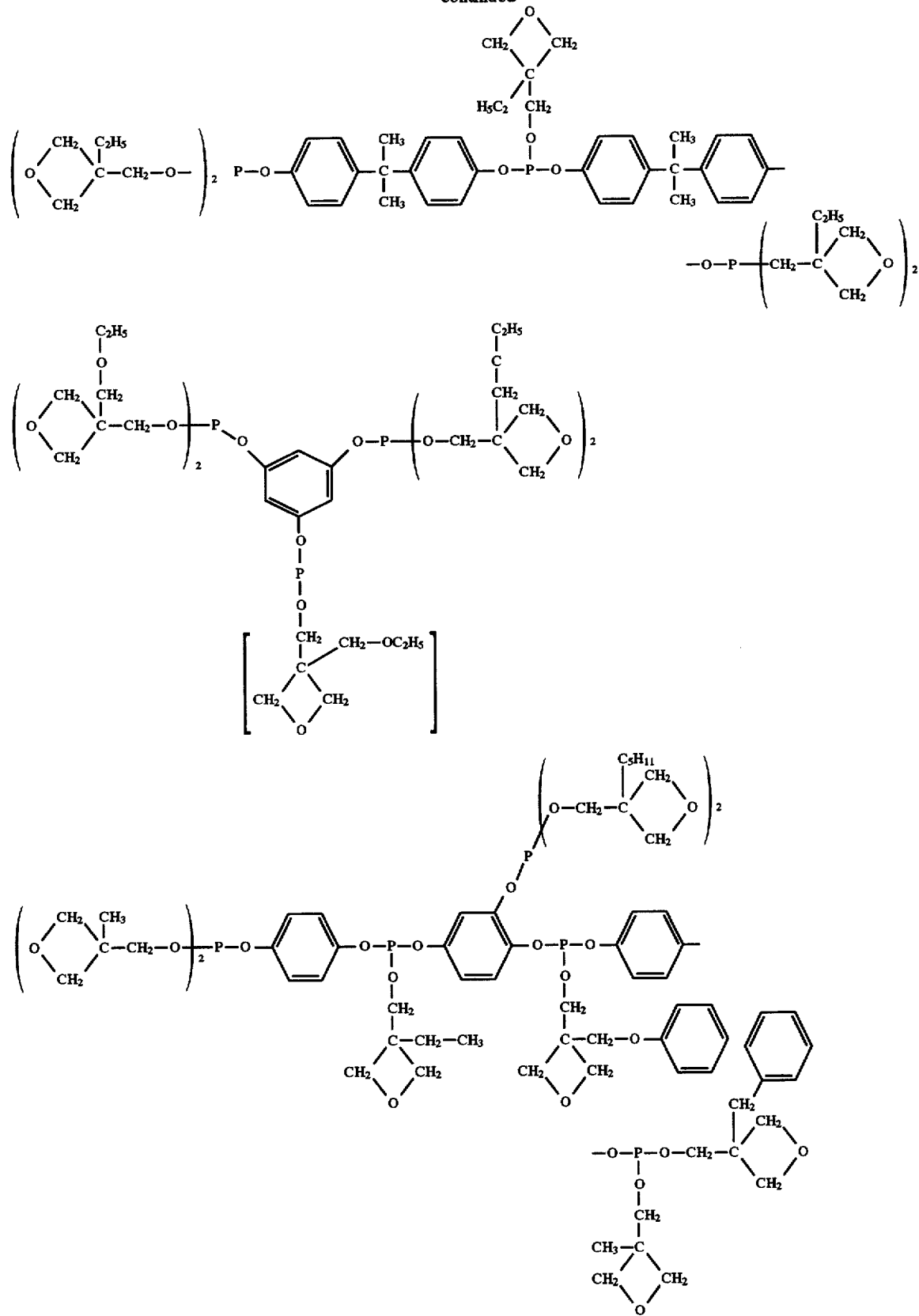

These phosphorous acid esters of formula (I) are known and can be prepared by the methods described in DE-OS 22 55 639 (=U.S. Pat. Nos. 4,073,769 and 4,323,501). The neutral esters of phosphorous acid which are also cited are likewise known (DE-OS 2 140 207, corresponding to U.S. Pat. No. 3,794,629).

The phosphites of formula (I) according to the invention, in which R is the radical of a monoalcohol containing an oxetane group, may be prepared, for example, by the reaction of a mixture consisting of a monoalcohol R-OH, which contains oxetane groups, and of an aryl compound which contains two or more phenolic hydroxyl groups, for example a bisphenol of formula (III), with triphenyl phosphite in the presence of an alkaline catalyst, wherein the desired product is formed with the splitting off of phenol. A suitable reaction temperature is 100°–180° C.; suitable catalysts include NaOH, NaOCH$_3$, Na phenolate, Na$_2$CO$_3$, KOH and tributylamine.

The reaction may be conducted in the absence of solvent or with the addition of solvents. The molar ratio of the reactants, namely the monoalcohol R—OH which contains oxetane groups, the aryl compound, and triphenyl phosphite, follows from the final product of formula (I) which is to be prepared.

The phosphites containing oxetane groups as defined by component B) may be added to the polymers either individually or in combination with each other in the said concentrations.

The stabilised polymers may be produced either by adding the phosphite in pure form to the molten polymer or optionally by adding the phosphite in solution in a low-boiling solvent to the polymer. The stabilised polymers can also be produced by saturating the powdered or granulated polymer and in each case optionally minerals, aerosils or other suitable supporting base with the phosphite (optionally with dissolution of the latter in a solvent, such as isopropanol for example) in a suitable mixing apparatus, optionally with subsequent compacting. The polymers according to the invention can also be produced by addition as a batch during the production/compounding process (production of the batch by incorporating the phosphite in the polymer, by extrusion for example), optionally as a batch based on polyalkylene terephthalate or optionally as a batch based on polycarbonate. The batch may be in the form of granules or in the form of a powder. Work-up/processing of the polymers according to the invention is effected by known techniques.

The same applies to the addition of the phosphite to the melt, or in a solvent, during the production of the polymer by known methods.

Component C

Glass fibres, glass spheres, mica, silicates, quartz, french chalk, titanium dioxide, wollastonite, etc., may be used as fillers and reinforcing materials, and may also be surface-treated. Commercially available glass fibres are the preferred reinforcing materials. The glass fibres, which generally have a fibre diameter between 8 and 18 μm, may be used as continuous fibres or as chopped or milled fibres, wherein the fibres may or may not be provided with a suitable bonding agent or bonding agent system for the respective polymer which is used according to the invention.

Component D

Commercially available organic compounds or halogen compounds containing synergists, or commercially available organic nitrogen compounds, or organic/inorganic phosphorus compounds are suitable as flame retardant additives. Mineral flame retardant additives such as Mg hydroxide or Ca—Mg carbonate hydrate (e.g. DE-OS 4 236 122) may also be used.

The following are cited as examples of organic compounds containing halogens, particularly brominated and chlorinated compounds:

ethylene-1,2-bis-tetrabromophthalimide,
epoxidised tetrabromobisphenol A resin,
tetrabromobisphenol A oligocarbonate,
tetrachlorobisphenol A oligocarbonate,
pentabromopolyacrylate,
brominated polystyrene.

Pentabromopolyacrylate generally has an average molecular weight $\overline{M}_w$ (weight average) of 10,000 to 200,000; brominated polystyrene generally has an average molecular weight of 10,000 to 500,000.

Epoxidised tetrabromobisphenol A and tetrabromobisphenol A oligocarbonate are preferably used.

Epoxidised tetrabromobisphenol A is a known diepoxy resin with a molecular weight of about 350 to about 2100, preferably 360 to 1000, most preferably 370 to 400, and essentially consists of at least one condensation product of bisphenol A and epihalogenhydrin; it is characterised by formula (IV)

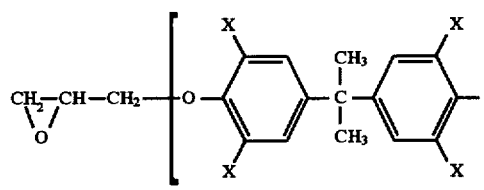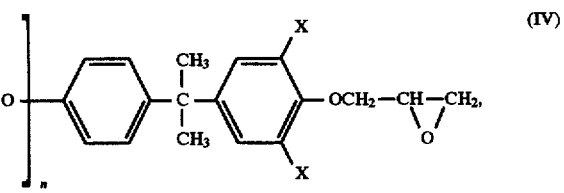

(IV)

where

X represents hydrogen or bromine, and n is a mean numerical value between zero and less than 2.3 (see EP-A 180 471, for example).

Tetrabromobisphenol A oligocarbonate or tetrachlorobisphenol A oligocarbonate is characterised by formula (V), the oligomers being terminated either with phenol or with tribromophenol or trichlorophenol, respectively:

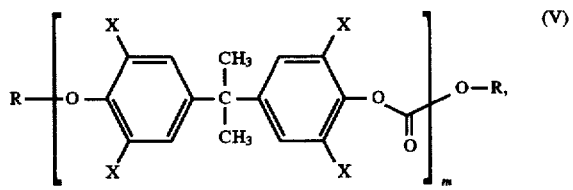

(V)

in which

R = [phenyl]—O—  or  [2,6-dibromophenyl with X]—O— where
X represents hydrogen, chlorine or bromine, and
n is a mean numerical value between 4 and 7.

Tetrabromo(chloro)bisphenol A oligocarbonate is known and can be prepared by known methods.

The phosphorus compounds according to EP-A 345 522 (U.S. Pat. No. 061,745) or DE-OS 43 28 656.9, in the amounts described therein, e.g. triphenyl phosphate, oligomeric phosphates, resorcinol diphosphate or a mixture thereof, are suitable as organic phosphorus compounds.

Component E

Suitable elastomeric modifiers include commercially available EP(D)M rubbers, graft rubbers based on butadiene, styrene, acrylonitrile, acrylate rubbers, thermoplastic polyurethanes (as described above) or EVA copolymers with or without functional coupling groups (e.g. EP-A 345 522). These elastomeric modifiers as suitable as blend coadjuvants for polyalkylene terephthalates, styrene polymers and polyphenylene sulphides.

The phosphorous acid esters according to the invention may be used to provide stabilisation from discoloration during the production, compounding and processing of the said thermoplastics.

The present invention therefore also relates to the use of the aforementioned phosphorous acid esters for the stabilisation of polyolefine and styrene polymer moulding compositions.

The moulding compositions according to the invention may contain customary additives, such as parting and demoulding agents, auxiliary processing agents, nucleating agents, antistatic agents and stabilisers.

The moulding compositions according to the invention, comprising the respective components and optionally other known additives such as stabilisers, colorants, pigments, parting and demoulding agents, reinforcing materials, nucleating agents and antistatic agents, can be produced by mixing the respective constituents in the known manner and compounding or extruding them as a melt at appropriate temperatures for polymers, in customary processing units such as internal kneaders, extruders or twin-shaft screw devices.

The moulding compositions according to the invention may be used for the production of moulded bodies and films which have been stabilised in relation to discoloration and degradation on thermal ageing and when subject to the long-term effects of hot water.

The present invention therefore also relates to the use of the aforementioned thermoplastic moulding compositions for the production of moulded bodies and films, and to the moulded bodies and films produced therefrom.

EXAMPLES

Phosphorous acid esters used:
phosphite A:

$$P\left[-O-CH_2-C(C_2H_5)(CH_2-O-)CH_2\right]_3$$

phosphite B:

$$(CH_3)_2C\text{-}[phenyl]\text{-}O-P\left[O-CH_2-C(C_2H_5)(CH_2-O-)_2\right]_2$$

Example 1

(comparison)

100% by weight polystyrene 476 L (BASF AG)

Example 2

(according to the invention)

99.90% by weight polystyrene 476 L (BASF AG)

0.10% by weight phosphite A

Example 3

(according to the invention)

99.4335% by weight polystyrene 476 L (BASF AG)

0.5665% by weight phosphite B as a solution in isopropanol corresponding to 0.1% by weight pure phosphite B, 0.4665% by weight isopropanol

Example 4

(comparison)

100% by weight Lucalen A 2910M (BASF AG)= polyethylene

Example 5

(according to the invention)

99.90% by weight Lucalen A 2910M (BASF AG)

0.10% by weight phosphite A

Example 6

(according to the invention)

99.4335% by weight Lucalen A 2910M (BASF AG)

0.5665% by weight phosphite B as a solution in isopropanol corresponding to 0.1% by weight pure phosphite B, 0.4665% by weight isopropanol

Example 7

(comparison)

100% by weight Novolen 1100 L (BASF AG)= polypropylene

Example 8

(according to the invention)

99.90% by weight Novolen 1100 L (BASF AG)

0.10% by weight phosphite A

Example 9

(according to the invention)

99.4335% by weight Novolen 1100 L 0.5665% by weight phosphite B as a solution in isopropanol corresponding to 0.10% by weight pure phosphite B, 0.4665% by weight isopropanol.

Example 10

(comparison

100% by weight Lucryl G66 Q14 (BASF AG)= polymethylacrylate

Example 11

(according to the invention)

99.90% by weight Lucryl G66 Q14 (BASF AG)

0.10% by weight phosphite A

Example 12

(according to the invention)

99.4335% by weight Lucryl G66 Q14 (BASF AG)

0.5665% by weight phosphite B as a solution in isopropanol corresponding to 0.10% by weight pure phosphite B 0.4665% by weight isopropanol

Example 13

(comparison)

100% by weight Novodur P3T (BAYER AG)= acrylbutadienstyrene

Example 14

(comparison)

99.90% by weight Novodur P3T (BAYER AG)

0.10% by weight phosphite A

Example 15

(according to the invention)

99.4335% by weight Novodur P3T (BAYER AG)

0.5665% by weight phosphite B as a solution in isopropanol corresponding to 0.10% by weight pure phosphite B 0.4665% by weight isopropanol

Example 16

(comparison)

100% by weight Desmopan 385 S (BAYER AG)= thermoplastic polyurethane

Example 17

(according to the invention)

99.90% by weight Desmopan 385 S (BAYER AG)

0.10% by weight phosphite A

Example 18

(according to the invention)

99.4335% by weight Desmopan 385 S (BAYER AG)

0.5665% by weight phosphite B as a solution in isopropanol corresponding to 0.10% by weight pure phosphite B 0.4665% by weight isopropanol

Example 19

(comparison)

100% by weight Durethan B30S (BAYER AG)= polyamide

Example 20

(according to the invention)

99.90% by weight Durethan B30S (BAYER AG)

0.10% by weight phosphite A

Example 21

(according to the invention)

99.4335% by weight Durethan B30S (BAYER AG)

0.5665% by weight phosphite B as solution in isopropanol corresponding to 0.10% by weight pure phosphite B 0.4665% by weight isopropanol

Example 22

(comparison)

100% by weight Tedur KU 1-9510 (BAYER AG)= polyphenylenesulphide

Example 23

(according to the invention)

99.90% by weight Tedur KU 1-9510 (BAYER AG)

0.10% by weight phosphite A

Example 24

(according to the invention)

99.4335% by weight Tedur KU 1-9510 (BAYER AG)

0.5665% by weight phosphite B as a solution in isopropanol corresponding to 0.10% by weight pure phosphite B 0.4665% by weight isopropanol The components were mixed and subsequently compounded by means of an extruder. The granular material obtained was injection moulded in a commercially available injection moulding machine to form moulded bodies.

TABLE 1

| Test | Units | Specification | Conditions | Example 1 (comparison) | Example 2 (according to the invention) | Example 3 (according to the invention) |
|---|---|---|---|---|---|---|
| Izod notched impact strength $a_k$ | $kJ/m^2$ | ISO 180/1A | Without ageing, at 23° C., air | 5.2 | 5.4 | 5.7 |
| Izod impact strength $a_n$ | $kJ/m^2$ | ISO 180/1U | Without ageing, at 23° C., air | 8 × 95 | 9 × 100 | 8 × 106 |
| $a_n$ | $kJ/m^2$ | ISO 180/1U | 7 days/ 90° C. air | 10 × 80 | 9 × 83 | 10 × 92 |
| $a_n$ | $kJ/m^2$ | ISO 180/1U | 14 days/ 90° C. air | 10 × 78 | 10 × 81 | 10 × 86 |
| $a_n$ | $kJ/m^2$ | ISO 180/1U | 7 days/ 90° C. $H_2O$ | 9 × 85 | 8 × 87 | 5 × 105 |
| $a_n$ | $kJ/m^2$ | ISO 180/1U | 14 days/ 90° C. $H_2O$ | 10 × 96 | 6 × 109 | 193 |
| MVR | $cm^3/10\ min$ | ISO 1133 | 230° C. 2.16 kg | 6.3 | 7.0 | 6.7 |
| Colour | | Visual assessment | Without ageing, at 23° C., air | light | lighter than Ex. 1 | as in Ex. 2 |
| Colour | | Visual assessment | 7 days/ 90° C. air | slight yellowish discoloration | no discoloration | as in Ex. 2 |
| Colour | | Visual assessment | 14 days/ 90° C. air | considerably more yellowing than after 7 days | slightly yellow but much lighter than Ex. 1 | as in Ex. 2 |

Ten test specimens were always tested for impact toughness. All the values which are not listed have therefore not been quoted because they were not broken during the test.

TABLE 2

| Test | Units | Specification | Conditions | Example 4 (comparison) | Example 5 (according to the invention) | Example 6 (according to the invention) |
|---|---|---|---|---|---|---|
| flexural stress at 3.5% strain | $N/mm^2$ | ISO 178/ | 5 mm/min | 3.1 | 3.3 | 3.3 |
| flexural strength | $N/mm^2$ | ISO 178/ | 5 mm/min | 5.4 | 6.1 | 6.2 |
| flexural strain at flexural strength | % | ISO 178/ | 5 mm/min | 7.0 | 7.6 | 7.9 |
| Izod notched impact strength $a_k$ | $kJ/m^2$ | ISO 180/1A | without ageing, at 23° C., air | not broken | not broken | not broken |
| $a_k$ | $kJ/m^2$ | ISO 180/1A | 5 days/ 80° C., air | not broken | not broken | not broken |
| $a_k$ | $kJ/m^2$ | ISO 180/1A | 10 days/ 80° C., air | not broken | not broken | not broken |
| MVR | $cm^3/10\ min$ | ISO 1130 | 230° C./ 2.16 kg | 29.2 | 28.4 | 25.8 |
| Colour | | Visual assessment | Without ageing, at 23° C., air | grey-yellow, transparent | lighter than Ex. 4, transparent | lighter than Ex. 4, transparent |
| Colour | | Visual assessment | 5 days/ 80° C., air | more yellow, not completely transparent | lighter than Ex. 4, transparent | as in Ex. 5 |
| Colour | | Visual assessment | 10 days/ 80° C., air | considerably more yellow, almost translucent | lighter than Ex. 4, transparent | as in Ex. 5 |

TABLE 3

| Test | Units | Specification | Conditions | Example 7 (comparison) | Example 8 (according to the invention) | Example 9 (according to the invention) |
|---|---|---|---|---|---|---|
| Izod notched impact strength $a_k$ | $kJ/m^2$ | ISO 180/1A | At 23° C. in air | 7.1 | 7.7 | 7.9 |
| Izod impact strength $a_n$ | $kJ/m^2$ | ISO 180/1U | Without ageing, at 23° C., air | 74 | 75 | 65 |
| $a_n$ | $kJ/m^2$ | ISO 180/1U | 5 days/ 60° C., air | 67 | 75 | 66 |
| $a_n$ | $kJ/m^2$ | ISO 180/1U | 10 day/ 60° C. air | 71 | 72 | 63 |
| MVR | $cm^3/10\ min$ | ISO 1133 | 250° C./ 2.16 kg | 12.7 | 12.3 | 12.2 |
| colour | | Visual assessment | Without ageing, at 23° C. | milky light, translucent | lighter than Ex. 7, transparent | lighter than Ex. 7, transparent |
| colour | | Visual assessment | 5 day/ 60° C., air | somewhat more yellos translucent | no change | no change |
| colour | | Visual assessment | 10 days/ 60° C., air | more yellow, more translucent | no change | no change |

TABLE 4

| Test | Units | Specification | Conditions | Example 10 (comparison) | Example 11 (according to the invention) | Example 12 (according to the invention) |
|---|---|---|---|---|---|---|
| Izod impact strength $a_n$ | $kJ/m^2$ | ISO 180/1U | At 23° C. in air | 13 | 13 | 13 |
| $a_n$ | $kJ/m^2$ | ISO 180/1U | 7 days/ 60° C., air | 13 | 13 | 12 |
| $a_n$ | $kJ/m^2$ | ISO 180/1U | 14 days/ 60° C., air | 12 | 13 | 13 |
| $a_n$ | $kJ/m^2$ | ISO 180/1U | 5 days/ 60° C. $H_2O$ | 12 | 13 | 14 |

TABLE 4-continued

| Test | Units | Specification | Conditions | Example 10 (comparison) | Example 11 (according to the invention) | Example 12 (according to the invention) |
|---|---|---|---|---|---|---|
| $a_n$ | kJ/m² | ISO 180/1U | 10 days/ 60° C. H₂O | 12 | 13 | 12 |
| MVR | cm³/ 10 min | ISO 1130 | 200° C./ 2.16 kg | 0.55 | 0.58 | 0.59 |
| Colour | | Visual assessment | without ageing, at 23° C. | transparent | transparent, lighter than Ex. 10 | transparent, lighter than Ex. 11 |
| Colour | | Visual assessment | 5 days/ 60° C. air | transparent | transparent, lighter than Ex. 10 | transparent, lighter than Ex. 11 |
| Colour | | Visual assessment | 10 days/ 60° C. air | translucent | translucent, lighter than Ex. 10 | translucent, lighter than Ex. 11 |
| Colour | | Visual assessment | 5 days/ 60° C. H₂O | transparent | translucent, lighter than Ex. 10 | translucent, lighter than Ex. 11 |
| Colour | | Visual assessment | 10 days/ 60° C. H₂O | translucent | translucent, lighter than Ex. 10 | translucent, lighter than Ex. 11 |

TABLE 5

| Test | Units | Specification | Conditions | Example 13 (comparison) | Example 14 (according to the invention) | Example 15 (according to the invention) |
|---|---|---|---|---|---|---|
| Izod impact strength $a_n$ | kJ/m² | ISO 180/1U | at 23° C. air | 104 | 100 | 117 |
| $a_n$ | kJ/m² | ISO 180/1U | 7 days/ 100° C. air | 83 | 70 | 95 |
| $a_n$ | kJ/m² | ISO 180/1U | 7 days/ 100° C. H₂O | 107 | 112 | 129 |
| MVR | cm³/ 10 min | ISO 1133 | 220° C./ 10 kg | 1.9 | 1.9 | 1.9 |
| Colour | | Visual assessment | without ageing at 23° C. | light brown | light brown slightly darker than Ex. 13 | light brown colour as in Ex. 13 |
| Colour | | Visual assessment | 7 days/ 100° C. air | brown | brown darker than Ex. 13 | brown colour as in Ex. 13 |
| Colour | | Visual assessment | 7 days/ 100° C. H₂O | white | white | light white |

TABLE 6

| Test | Units | Specification | Conditions | Example 16 (comparison) | Example 17 (according to the invention) | Example 18 (according to the invention) |
|---|---|---|---|---|---|---|
| tensile stress at yield | MPa | ISO 527 | 50 mm/ min | 34 | 36 | 34 |
| break stress | MPa | ISO 527 | 50 mm/ min | 34 | 36 | 34 |
| elongation at break | % | ISO 527 | 5 mm/ min | 380 | 394 | 388 |
| notched impact strength $a_k$ | kJ/m² | ISO 180/1A | at 23° C. in air | not broken | not broken | not broken |
| $a_k$ | kJ/m² | ISO 180/1A | 7 days/ 130° C. air | not broken | not broken | not broken |
| MVR | cm³/ 10 min | ISO 1133 | 200° C./ 10 kg | 50 | 38 | 60 |
| Colour | | Visual assessment | without ageing at 23° C. | light translucent | light, almost transparent | light, lightest colour, transparent |
| Colour | | Visual assessment | 7 days/ 130° C. air | yellow, almost transparent | yellow, transparent | yellow, lightest colour, transparent |

TABLE 7

| Test | Units | Specification | Conditions | Example 19 (comparison) | Example 20 (according to the invention) | Example 21 (according to the invention) |
|---|---|---|---|---|---|---|
| elongation at break | % | ISO 527 | 5 mm/ min | 31 | 39 | 43 |
| notched impact strength $a_k$ | kJ/m² | ISO 180/1A | at 23° C. in air | 5.2 | 5.5 | 5.5 |
| $a_k$ | kJ/m² | ISO 180/1A | 7 days/ 180° C. air | 8 | 10 | 8 |
| $a_k$ | kJ/m² | ISO 180/1A | 14 days/ 180° C. air | 11 | 9 | 12 |
| impact strength $a_n$ | kJ/m² | ISO 180/1U | at 23° C. in air | not broken | not broken | not broken |
| $a_n$ | kJ/m² | ISO 180/1U | 7 days/ 100° C. H₂O | not broken | not broken | not broken |
| $a_n$ | kJ/m² | ISO 180/1U | 14 days/ 100° C. H₂O | not broken | not broken | not broken |
| Colour | | Visual assessment | without ageing at 23° C. | light-yellow | lighter than Ex. 19 | lighter than Ex. 20 |
| Colour | | Visual assessment | 7 days/ 180° C. air | yellow | somewhat lighter than Ex. 19 | somewhat lighter than Ex. 20 |
| Colour | | Visual assessment | 14 days/ 180° C. air | a little bit dark yellow | lighter than Ex. 19 | lighter than Ex. 20 |

TABLE 7-continued

| Test | Units | Specification | Conditions | Example 19 (comparison) | Example 20 (according to the invention) | Example 21 (according to the invention) |
|---|---|---|---|---|---|---|
| Colour | | Visual assessment | 7 days/ 100° C. H₂O | light-yellowish | somewhat lighter than Ex. 19 | somewhat lighter than Ex. 20 |
| Colour | | Visual assessment | 14 days/ 100° C. H₂O | light-yellowish | somewhat lighter than Ex. 19 | somewhat lighter than Ex. 20 |

TABLE 8

| Test | Units | Specification | Conditions | Example 22 (comparison) | Example 23 (according to the invention) | Example 24 (according to the invention) |
|---|---|---|---|---|---|---|
| MVR | cm³/ 10 min | ISO 1133 | 320° C./ 5 kg | 57 | 61 | 59 |
| Colour | | Visual assessment | without ageing | dark grey | lighter than Ex. 22 | lighter than Ex. 23 |

We claim:

1. Thermoplastic moulding compositions containing
   A) polymers selected from the group consisting essentially of polyolefines, styrene polymers, polyamides, polyalkyl methacrylates, polyphenylene sulphides, ABS graft polymers, and thermoplastic polyurethanes, and
   B) esters of phosphorous acid which contain at least one oxetane group and at least one radical of a dihydric or polyhydric phenol per molecule, and
optionally, at least one of the following components,
   C) fillers and reinforcing materials,
   D) flame retardant additives, and
   E) elastomeric modifiers.

2. Thermoplastic moulding compositions according to claim 1, wherein the moulding compositions contain 20 to 99.9 parts by weight of component A), 0.01 to 2.5 parts by weight of component B), up to 45 parts by weight of component C), up to 55 parts by weight of component D), and up to 30 parts by weight of component E).

3. Thermoplastic moulding compositions according to claim 1, wherein component B) is selected from phosphorous acid esters of formula (I)

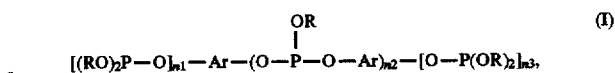

where
   $n_1$ represents 1 or any integer >1,
   $n_2$ represents 0 or any integer >0,
   $n_3$ represents 1 or any integer >1,
   R represents alkyl, aralkyl, cycloalkyl, aryl or heteroaryl, wherein at least one of the radicals R constitutes a monoalcohol containing at least one oxetane group, and
   Ar represents aryl, which may optionally be substituted by alkyl and/or hydroxy, and where when $n_2 \neq 0$ Ar may be the same or different,
and compounds selected from the group consisting of
tris-[(3-ethyloxetanyl-3)-methyl]-phosphite,
tris-[(3-pentyloxetanyl-3)-methyl]-phosphite,
phenyl-bis-[(3-ethyloxetanyl-3)-methyl]-phosphite,
2-phenoxy-spiro(1,3,2-dioxaphosphorinane-5,3'-oxetane), and
3,3-bis-[spiro(oxetane-3',5"-(1",3",2"-dioxaphosphorinane-2"))-oxy-methyl]-oxetane.

4. Thermoplastic moulding compositions according to claim 3, wherein R in formula (I) represents $C_1$–$C_{18}$-alkyl, mono- or polynuclear $C_3$–$C_{10}$-cycloalkyl, phenyl-$C_1$–$C_2$-alkyl, mono- or polynuclear $C_6$–$C_{18}$-aryl, and heteroalkyl, wherein the aryl radicals may be substituted by alkyl and/or halogen, and R further represents an oxetane group

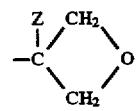

where
   Z represents hydrogen, $CH_3$, $C_2H_5$, $n$-$C_5H_{11}$, —$CH_2$—$C_5H_{11}$, —$CH_2$—O—$C_6H_{13}$ or $CH_2$—O—$C_2H_5$.

5. Thermoplastic moulding compositions according to claim 3, wherein the radical Ar is derived from hydroquinone, resorcinol, catechol, di-t-butyl catechol, 4,4'-dihydroxydiphenyl, bis-(hydroxy-phenyl)-alkanes, bis-(hydroxyphenyl)-cycloalkanes, α,α'-bis-(hydroxyphenyl)-diisopropylbenzene and derivatives thereof which comprise alkylated or halogenated nuclei, phloroglucinol, or pyrogallol.

6. Thermoplastic moulding compositions according to claim 1, wherein component B) is

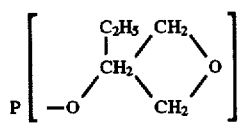

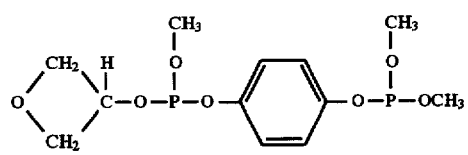

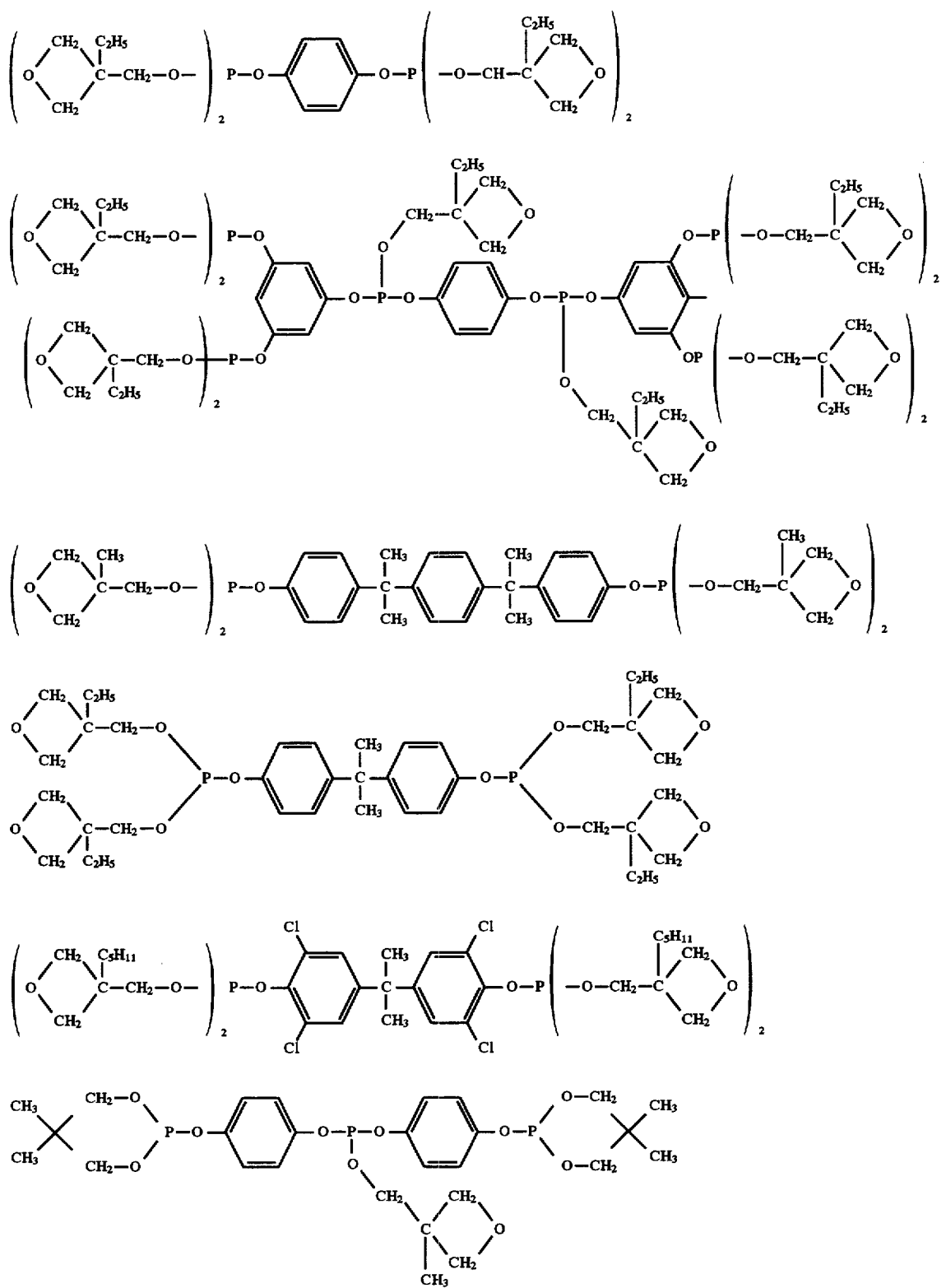

-continued
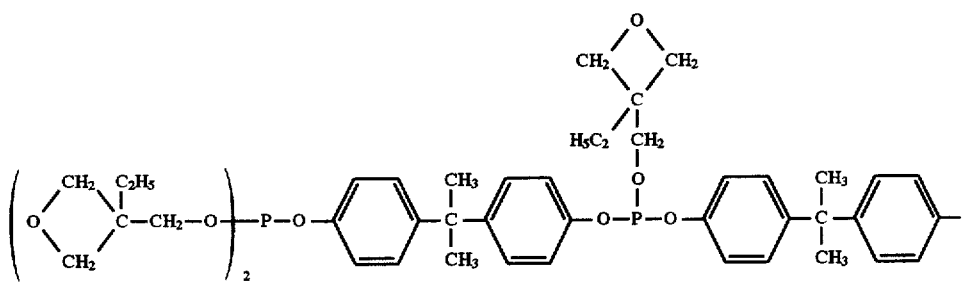
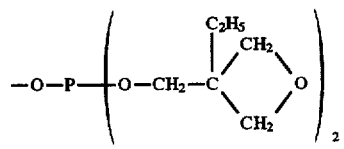
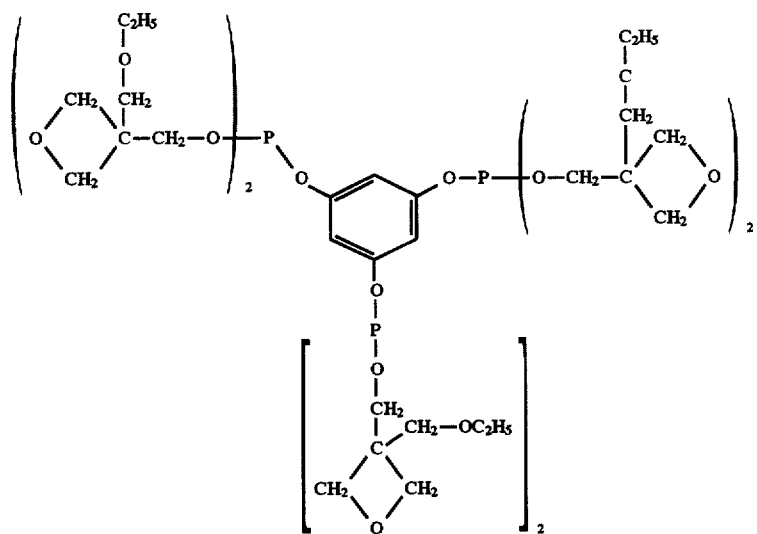
or

-continued

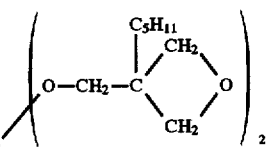
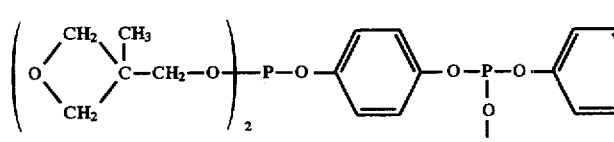
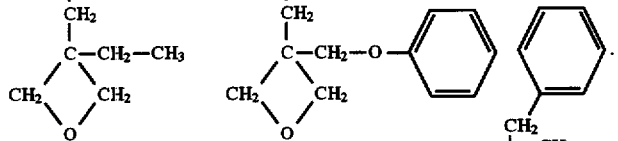
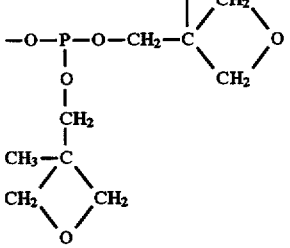

7. Thermoplastic moulding compositions according to claim 3, wherein component B) is

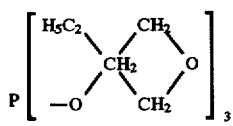

or

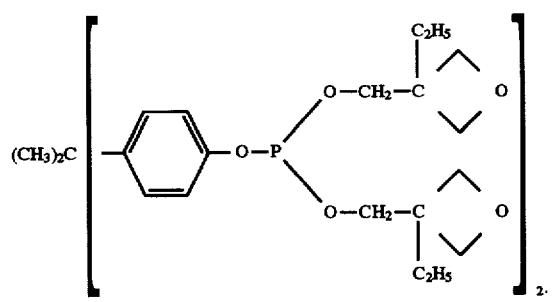

8. A method of using the moulding compositions according to claim 1, comprising the step of inserting one of the compositions into a mould.

9. Moulded bodies and films produced from moulding compositions according to claim 1.

10. A method of using the moulding compositions according to claim 1, comprising the step of forming one of said compositions into a film.

11. A thermoplastic moulding composition according to claim 1 wherein component A) is a polyolefine.

12. A thermoplastic moulding composition according to claim 1, wherein component A) is a styrene polymer.

13. A thermoplastic moulding composition according to claim 1, wherein component A) is a polyamide.

14. A thermoplastic moulding composition according to claim 1, wherein component A) is a polyalkyl methacrylate.

15. A thermoplastic moulding composition according to claim 1, wherein component A) is a polyphenylene sulphide.

16. A thermoplastic moulding composition according to claim 1, wherein component A) is a ABS graft polymer.

17. A thermoplastic moulding composition according to claim 1, wherein component A) is a thermoplastic polyurethane.

18. Thermoplastic moulding compositions consisting essentially of

A) polymers selected from the group consisting essentially of polyolefines, styrene polymers, polyamides, polyalkyl methacrylates, polyphenylene sulphides, ABS graft polymers, and thermoplastic polyurethanes, and B) esters of phosphorous acid which contain at least one oxetane group and at least one radical of a dihydric or polyhydric phenol per molecule, and optionally, at least one of the following components, C) fillers and reinforcing materials, D) flame retardant additives, and E) elastomeric modifiers.

19. Thermoplastic moulding compositions according to claim 3, wherein the R groups in formula (I) may be the same or different and each R is $C_1$–$C_{18}$-alkyl, mononuclear $C_3$–$C_{10}$-cycloalkyl, polynuclear $C_3$–$C_{10}$-cycloalkyl, phenyl-$C_1$–$C_2$-alkyl, mononuclear $C_6$–$C_{18}$-aryl, polynuclear $C_6$–$C_{18}$-aryl, heteroalkyl or an oxetane group having the formula
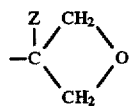
where
Z is hydrogen, $CH_3$, $C_2H_5$, $n$-$C_5H_{11}$, —$CH_2$—$C_5H_{11}$, —$CH_2$—O—$C_6H_{13}$ or —$CH_2$—O—$C_2H_5$,
further wherein when R is mononuclear $C_6$–$C_{18}$-aryl or polynuclear $C_6$–$C_{18}$-aryl, the aryl radicals may be substituted by alkyl and/or halogen.
* * * * *

UNITED STATES PATENT AND TRADEMARK OFFICE
CERTIFICATE OF CORRECTION

PATENT NO.    : 5,726,227
DATED         : March 10, 1998
INVENTOR(S)   : Magerstedt, et. al.

It is certified that error appears in the above-identified patent and that said Letters Patent is hereby corrected as shown below:

In Column 21, the two (2) formulae located directly below the first two lines of claim 3, should be moved to the end of column 22, directly under the first two lines of claim 6, after the phrase, "wherein component B) is".

Signed and Sealed this

Eighth Day of September, 1998

Attest:

BRUCE LEHMAN

Attesting Officer

Commissioner of Patents and Trademarks